Jan. 19, 1937.    W. NAGEL    2,068,301
OPTICAL COLOR MATCHING APPARATUS
Filed May 28, 1935

Patented Jan. 19, 1937

2,068,301

UNITED STATES PATENT OFFICE 2,068,301

OPTICAL COLOR-MATCHING APPARATUS

Wilhelm Nagel, Freiburg in Breisgau, Germany

Application May 28, 1935, Serial No. 23,899
In Germany April 21, 1934

4 Claims. (Cl. 88—14)

The invention relates to optical color testing apparatus for use in investigating the constitution or properties of translucent substances by ascertainment of their color tones, as for example in testing the pH concentration of solutions, the quality of water for drinking, bathing or steam raising purposes, the quality of beer, the phosphate content of soil, and various clinical purposes.

In some kinds of apparatus for such purposes glass slides or solutions, of standard colors, are used for comparison with the substance under test, and a very large number of them may be required for any particular piece of work. Moreover the colored solutions available for the purpose are generally not stable, and however many slides or solutions are used it is quite impossible to secure a continuous transition from one end of the scale to the other. There must be transition by steps, with omission of some of the tones.

According to my invention the range of color tones used for comparison with the substance under test is produced by purely optical means enabling a continuous change of color tone from one end of the scale to the other to be produced by an adjustment which can be measured. The adjustment made in order to produce the tone agreeing with that of the substance under test is, therefore, an index to the constitution or properties of that substance.

The apparatus of my invention includes a polariscope in which either the polarizer or the analyzer is rotatable, and in the path of the beam between the polarizer and analyzer there is a piece of double refracting crystal, e. g. quartz, mica or gypsum, which can be rotated about an axis perpendicular to the beam. The beam which has passed through this part of the apparatus is thrown on to a screen placed in position for comparison with another screen, on to which is thrown a beam which has passed through the substance under test. It is convenient to make the two beams pass through a prism which deflects them so that the screens or reflectors receiving them can be placed closely side by side. A single emitter of light may be used for producing both the beams. In some cases sunlight may be used.

Figure 1:
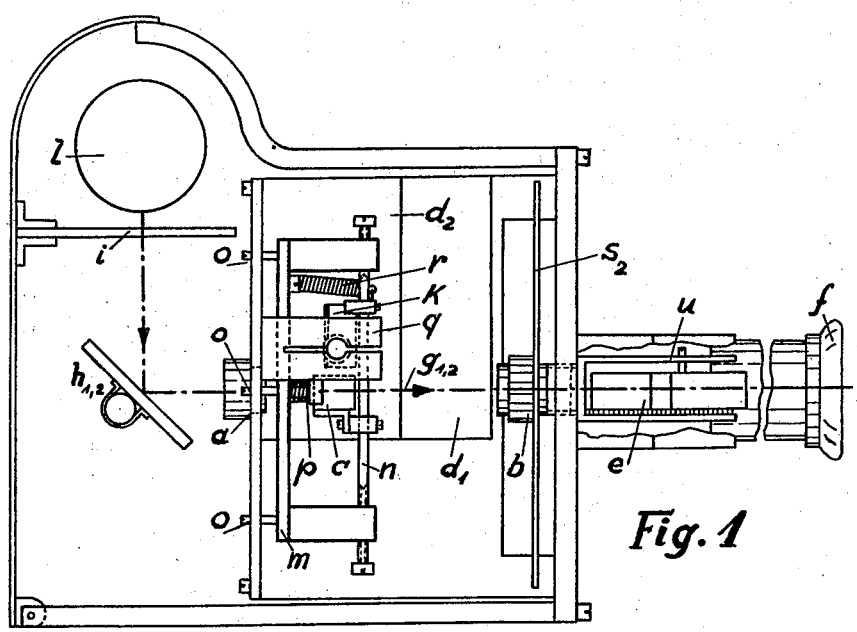

An example of apparatus according to the invention is shown in the accompanying drawing, in which Fig. 1 is an elevation thereof, with a side wall removed to expose the interior.

Figure 2:
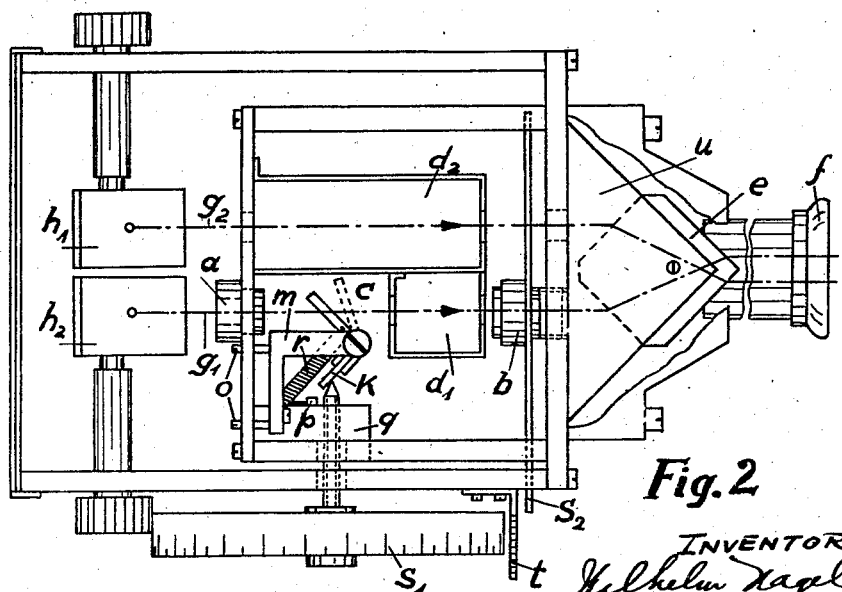

Fig. 2 is a plan view, with the top removed.

An electric lamp $l$ throws light through a filter $i$ of blue glass onto two reflectors $h_1$, $h_2$, which project horizontal beams indicated by the chain lines, $g_1$, $g_2$. The function of the blue glass filter is to transform the yellow light produced by an ordinary electric light into a white light or what may be termed conventionally daylight. The beam $g_1$ passes through a polarizer $a$, a small slab of crystal $c$, a box $d_1$, and a rotatable analyzer $b$. The crystal $c$ is preferably a mica plate having plano parallel surfaces which are formed by the natural plane of cleavage of the mica. The cutting may be done without consideration of the location of the plane of its optical axis. In this particular case, the plate might be round, in which case, the diameter of the plate would be about 12 mm. However, the plate might be equally quadratic shape with corresponding lengths for the sides of the square. The polarizer and the analyzer may consist of Nicol prisms. The beam $g^2$ passes through a container $d_2$ containing the solution to be tested. The two beams pass through a prism $e$ fixed in a holder $u$ in the front part of the apparatus, and are deflected into juxtaposition for viewing them through an eyepiece $f$.

The slab of crystal $c$ is carried by a holder fixed to a vertical spindle $n$, and to the same spindle is fixed a small arm or plate $k$ of glass, perpendicular to the crystal slab. A spring $r$ holds the plate $k$ against the tip of a micrometer screw working in a holder $q$, so that the spindle can be rotated by turning the screw. For turning the screw a wheel $s_1$ is fixed thereto, with scale divisions marked on its rim, so that the amount of rotation given to the wheel can be read off with the aid of a scale $t$. The spindle $n$ is perpendicular to the beam $g_1$, and by its rotation the crystal $c$ is set at varying angles to the beam.

The spindle $n$ is supported by a bracket $m$, which can be adjusted by means of three set screws $o$, the bracket being held against these screws by a spring $p$. By adjusting the bracket the position of the spindle in relation to the micrometer screw can be altered, so that the angle through which the crystal $c$ is rotated by a given amount of rotation of the micrometer screw can be regulated as required, according to the thickness of the crystal.

By rotation of the analyzer $b$, measured by means of a scale $s_2$, the color used for comparison can be changed. By rotation of the analyzer and rotation of the crystal $c$ the required color tone is obtained, either a primary color or a mixed color.

The readings obtained from the scales $S_1$, $t$, $S_2$, may be used with reference to a table of pH values, grams or percentages, or may be used for comparison with readings obtained with a standard solution.

In use, the yellow light passing through the filter 2 is transformed into conventional daylight, and passes through the polarization system, consisting of the polarizer $a$ and the analyzer $b$, and thus passing through the crystal plate $c$, produces the following result:

By means of the crystal plate, the white light polarized by the polarizer is separated into two beams which vibrate at right angles to each other, which beams are then brought back to a common plane of vibration by means of the analyzer. However, the unequal speeds or velocities of the two beams through the crystal plate produce a difference in velocities between the two beams of light, thereby resulting in interference which wipes out those color components of the white light that amount to a difference in velocity of one half of a wave length or an odd multiple thereof, whereupon the color appears which complements the wiped out component to white. If the angle of the polarization planes is changed, which may be accomplished through rotation of the analyzer, the color will also change. This is due to the fact that the beams, when separated by the crystal, have different values depending upon their components falling upon the polarization plane of the analyzer in accordance with the degree or angle of rotation of the analyzer, for which reason the interfering beams (after their passage through the analyzer) will result in different colors depending upon the value of their components and according to the degree or angle of rotation of the analyzer.

The color can also be changed through rotation of the crystal plate $c$. This may be explained as follows:

Through rotation of the crystal plate, the path of the polarized light beams through the crystal plate is either lengthened or shortened. In other words, the effective thickness of the crystal plate varies according to the angle of rotation of the crystal plate. The greater the effective thickness of the crystal plate, the more the forward movement of the beam in the crystal plate will be delayed and vice versa. In this way, velocity differences between the two beams are created, which after passage of the beams through the analyzer result in interference and color phenomena.

Through suitable rotation of the analyzer and turning of the crystal plate, it is possible to obtain any desired color, and more important, the color that has been obtained may be accurately determined in figures. It is thus apparent that if the analyzer and the crystal plate are rotated or turned through a certain number of degrees, as indicated on their respective scales, the color which then appears will accurately correspond to certain predetermined values and will be the same each time the same values are reset on the scales. It is this fact that makes it possible to use the purely optically produced colors as comparative colors in color comparison measurements. It is thus apparent that through the arrangement described in the present invention, there has been created a means to determine a correct numerical value for each color to be tested through comparison of that color with the color produced in the apparatus, and the preparation of color solutions for comparison tests is completely eliminated.

What I claim as my invention and desire to secure by Letters Patent of the United States is:—

1. In optical apparatus for the purpose set forth, the combination of a polariscope having a polarizer and an analyzer, one of which is rotatable about its optical axis, a rotatable spindle having an arm, a holder on said spindle carrying a single slab of double refracting crystal between said polarizer and said analyzer so that by rotation of said spindle said slab can be set at varying angles to a beam of light passing between said polarizer and said analyzer, a micrometer screw adapted to bear against said arm and thereby rotate said spindle, and means for adjusting said spindle transversely of its axis in relation to said screw so that the amount of rotation imparted to said spindle by a given rotation of said screw can be varied.

2. In a colorimeter having means for passing light simultaneously through a substance to be tested and a color producing device, said color producing device comprising a polarizer and an analyzer, one of which is rotatable about its obtical axis, a single slab of double refracting crystal having plano parallel surfaces, said crystal slab being mounted between said polarizer and said analyzer, means for tilting said crystal slab to set the faces of the same at varying angles to the optical axis to vary the effective thickness of the crystal to a beam of light passing through said color producing device, and means for comparing the light which has passed through the substance with the optically created color.

3. In a colorimeter having means for passing light simultaneously through a substance to be tested and a color producing device, said color producing device comprising a polarizer and an analyzer, one of which is rotatable about its optical axis, a single slab of mica having plano parallel faces, said mica slab being mounted between said polarizer and said analyzer, means for tilting said mica slab to set the faces of the same at varying angles to the optical axis to vary the effective thickness of the mica slab to a beam of light passing through said color producing device, and means for comparing the light which has passed through the substance with the optically created color.

4. In a colorimeter having means for passing light, simultaneously through a substance to be tested and a color producing device, said color producing device comprising a polarizer and an analyzer, one of which is rotatable about its optical axis, a single slab of double refracting crystal having plano parallel faces, said crystal slab being mounted between said polarizer and said analyzer, means for moving said slab of crystal to gradually vary the effective thickness of the crystal with respect to said optical axis thereby to optically create colors in a successive stepless manner, and means for comparing the light which has passed through the substance with the optically created color.

WILHELM NAGEL.